Patented June 17, 1930

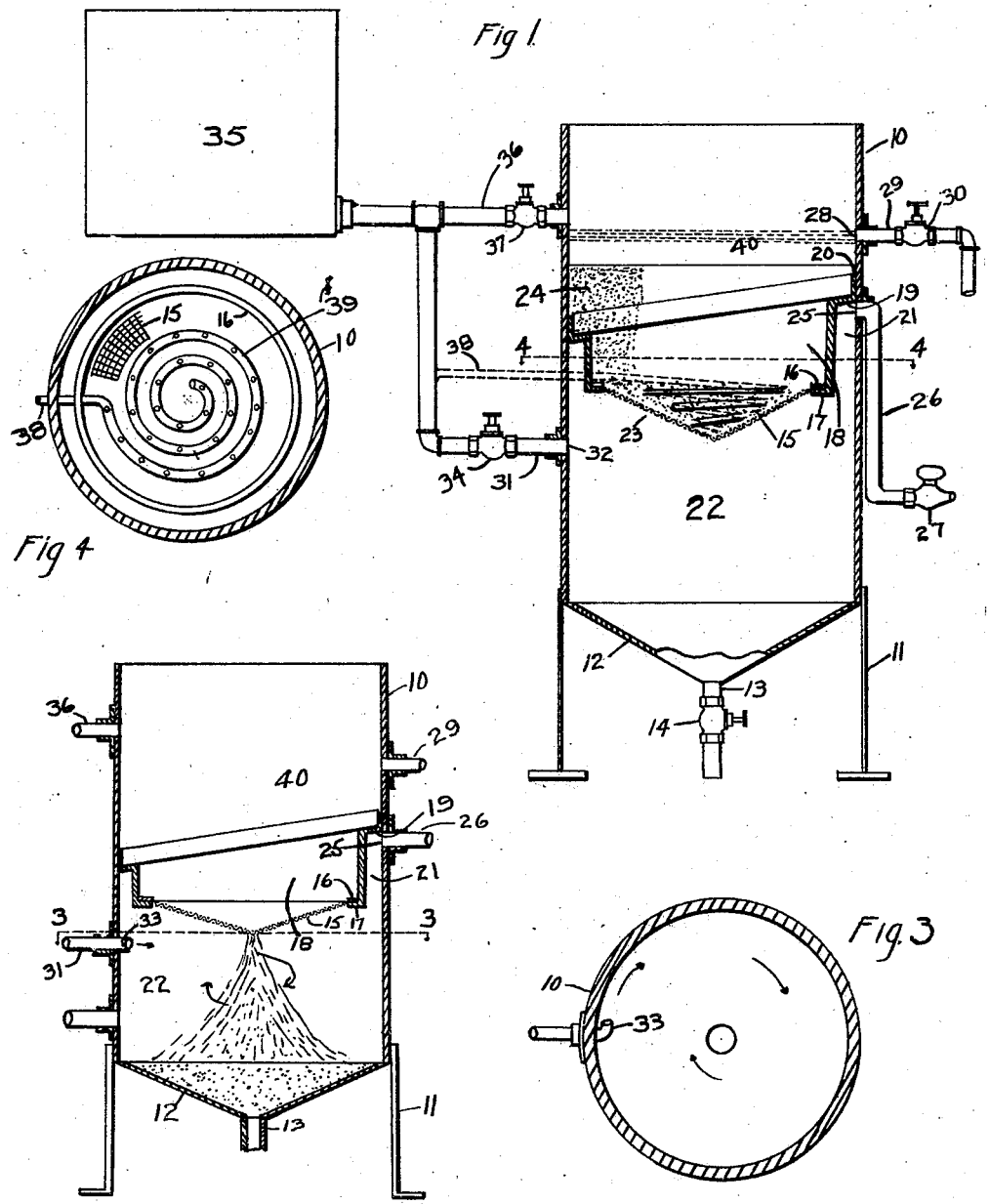

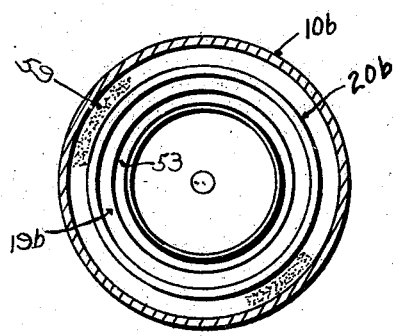
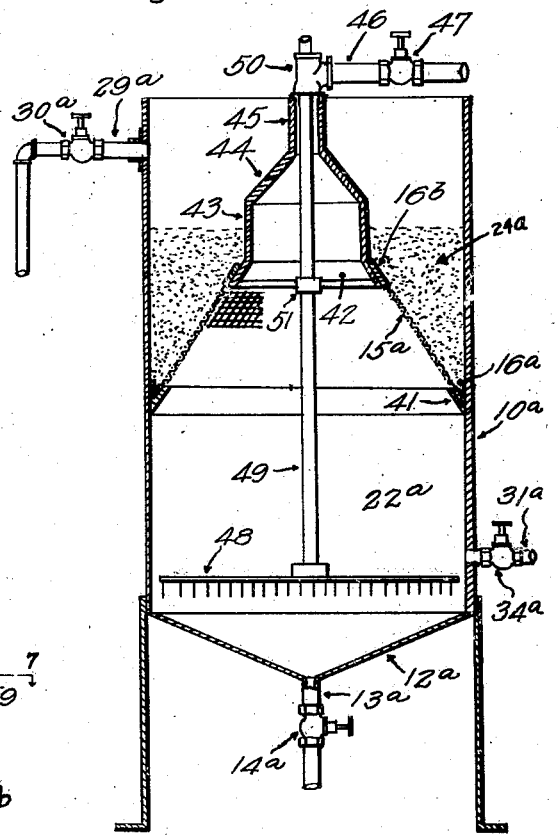
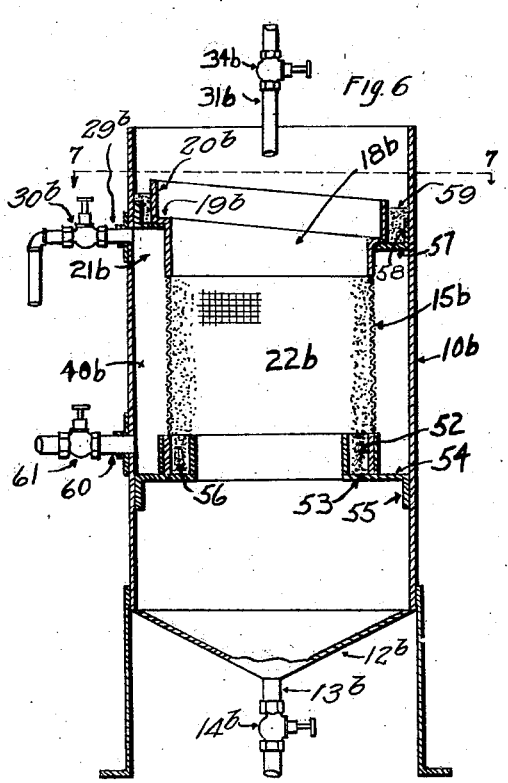

1,763,773

UNITED STATES PATENT OFFICE

ANTHONY H. GODBE, OF LOS ANGELES, CALIFORNIA, ASSIGNOR TO UNIVERSAL PROCESS COMPANY, A CORPORATION OF UTAH

METHOD OF AND APPARATUS FOR SEPARATING SOLIDS FROM LIQUIDS

Application filed November 1, 1926. Serial No. 145,573.

My invention relates to a method of and apparatus for separating solids from liquids by filtration, and is equally applicable to the recovery of dry solids as well as obtaining clear filtrates.

My invention is applicable to the filtration of all classes of materials, from liquids containing high percentages of slimes and solids, as in the leaching of ores, to those containing a small percentage of solids, such as waters used for drinking purposes, the making of ice and for use in boilers, etc.; my objects being high filtering speed, clear filtrates, economy of operation and low cost of maintenance of the apparatus. The apparatus used is extremely simple in structure and inexpensive to manufacture and install.

Present filtration methods are generally carried on in three ways. For coarser solids and heavy materials vacuum and pressure pumps are often used in connection with the leaching method. For the finer solids leaching by gravity is often resorted to, but in most instances, where the separation is carried on, on a large scale, these are separated either by the decantation method or the settling method. In each instance it has been difficult to obtain either dry products, where their recovery is sought, or clean filtrates, where that is the desideratum, with any degree of speed and economy.

Under existing methods and with known apparatuses filtration is imperfectly performed due to various causes, chief among which is the obstruction of the filter medium by air bubbles. Air in a filtrate chamber, in the form of bubbles confined by the liquids, has a tendency to cling tenaciously to the filter medium, whether it is constructed of metal or other solids, and it has a marked adhesiveness for metallic surfaces. The bubbles adhering to the filter medium, through capillary attraction, having a low surface tension—due to confinement in the liquid— resist rupture and consequently impede filtration. This is more particularly true where more or less fine mesh filter mediums are used for the separation of finer solids. Furthermore, adhesiveness is increased by any foreign matter adhering to the filter medium, such as organic matter, oil, grease, etc.

Air being present when the filter medium is first placed in the tank, and when the tank is first flooded with liquid, bubbles are formed due to the adhesive action of the air on the filter medium. These cling to the filter medium and trap within them molecules of air, organic or other matter, and form barriers around the meshes which resist rupture and impede filtration. Additional air enters the filter with the liquids being filtered, through imperfectly fitting joints and also through the filtrate discharge pipe, which tends to unite with the bubbles first formed and adhere to the filter medium, clogging the pores sufficient to resist the usual gravitational pressures. Impedance of free passage of liquids evenly through the filter medium causes the solids—especially the finer ones—to pack and settle against it, and increased pressure on the intake side of the filter medium, brought about in this way, forces the finer particles through the meshes and results in unclean filtrate. This impedance is not so extensive in the case of coarser solids, but it still exists to an extent sufficient to detract from efficient filtration, and in the case of finer solids often stops filtration altogether.

With present filtering methods and apparatus it is necessary, in order to obtain filtration, to use filter media of different size meshes adaptable to the size of the solids to be filtered. When coarsely ground material is being filtered a filter medium having correspondingly coarse meshes is used, but smaller in size than the solids in order to prevent them from passing through. The same is true in handling liquids containing more finely divided solids. In each instance there is a tendency to obstruction and retardation of filtration to a greater or less extent. When vacuum and pressure pumps are used in connection with filter media of this character there is a tendency of the solids to harden and pack in an impervious mass against the filter medium, creating still another obstruction, which greatly limits the capacity of the filter.

The foremost object of my invention is to eliminate this partial or complete interference with percolation through the filter medium in a simple and inexpensive manner. I accomplish these objects by first cleansing the filter medium of all foreign matter, both organic and inorganic, which may have an affinity for the attraction and adherence of air bubbles, and then place it in the tank and submerge it while wet, either immersing at the time in the liquid to be filtered, or filling the tank while the filter medium is still wet. This prevents not only the orginal formation of bubbles on the filter medium and within its meshes, but obviates their subsequent adherence thereto when passed through with the liquids, thus avoiding clogging and obtaining rapid filtration. I then regulate the velocity of flow of the feed and discharge, and position the point of discharge, so as to always maintain the liquids in contact with both sides of the filter medium, discharging no faster than the liquid passes through the filter medium. This prevents excessive pressure on the intake side of the filter medium which tends to force the finer solids through. It not only eliminates packing of the solids against the filter medium in an impervious mass, but tends to collect them in a soft porous mass adjacent its intake side and thus build up a filter medium from the solids being filtered. In this way I am enabled to use a filter medium of a mesh larger than the solids being filtered.

After first eliminating the air, as far as possible, from the filter medium, by cleansing, and placing it in the tank, I first eliminate the free air therein by filling the tank while the filter medium is still wet, unless the wet filter medium has been immersed in the liquid, in the tank, to be filtered. I further eliminate air bubbles from the liquids passing through by their entrapment in air chambers situated above the plane of the intake side of the filter medium. This arrangement is such as to avoid the collection of air on or around the filter medium and permits its being carried off during the filtering operation. After the filter medium has been cleansed, as above stated, air bubbles will freely pass through it as they will not be attracted by any dry or unclean surfaces.

The preferred form of apparatus which I may use in carrying out my method is illustrated in the accompanying drawings.

In these drawings, Figure 1 is a transverse vertical section taken through the center of a horizontal filter;

Figure 2 is a similar view showing a different arrangement of the feed pipe;

Figure 3 is a sectional plan view taken as indicated by the line 3—3 of Figure 2;

Figure 4 is a sectional plan view as indicated by the line 4—4 of Figure 1;

Figure 5 is a transverse vertical sectional view taken through the center of a modified form of the apparatus illustrated in Figure 1;

Figure 6 is a transverse vertical sectional view taken through the center of a filter illustrating the adaptation of the principles of my invention to a vertical filter; and Figure 7 is a sectional plan view taken as indicated by the line 7—7 of Figure 6.

Referring first to Figure 1, the numeral 10 indicates the filtering tank or receptacle. This may be either cylindrical, square or any other preferred configuration and may also be constructed of any suitable material, such as glass, cement, wood or metal. The size of the receptacle may, of course, be determined for the particular needs or the character of materials to be filtered. In the present instance, for purposes of illustration, I have shown a cylindrical metallic tank.

The tank 10 may be supported upon suitable legs or supports 11 and may have a conical bottom 12 terminating in a clean-out pipe 13. A suitable valve 14 may be provided for the pipe 13 to permit periodical removal of the slimes or solids.

The filter medium, designated by the numeral 15, may be formed of any of the usual materials, such as canvas, burlap, or wire screen. This is preferably in the form of an inverted cone, having an annular supporting band 16, of solid material, removably resting upon an annular seat 17. Any suitable packing may be utilized to seal the space intermediate the band 16 and seat 17, and where the filter medium 15 is formed of canvas or burlap upon a wire screen, which is the usual construction, the canvas or burlap may be extended out beyond the band 16 to form a seating cushion between it and the seat 17. The seat 17 consists of an inturned flange on the lower end of an inner tubular section 18, of a smaller diameter than the tank 10 and preferably supported concentric therein. The upper end of the section 18 is preferably inclined at an angle with the axis of the tank 10 and is formed with an outturned flange 19, around the periphery of which is an upturned flange 20, by means of which it is secured to the perimeter of the tank 10. The flange 19 and section 18 spaced from the inner face of the tank 10 form an annular air chamber 21 around the top of the space 22, which I will hereinafter term the feed chamber. Also, the air chamber 21 is disposed in a plane above the inlet side 23 of the filter medium 15.

If desired, a further filter medium, such as sand, charcoal or any of the usual filtering materials, may be filled in on the top of the filter medium 15, to a suitable level, as shown at 24.

At the highest point of the top of the air chamber 21, formed by the flange 19, I place an outlet aperture 25 into which a discharge pipe 26, having a control valve 27, is inserted.

A filtrate discharge aperture 28 is cut in the tank 10, into which is connected a discharge pipe 29 having a control valve 30. This aperture is positioned above the filter medium a suitable distance to permit the accumulation of a quantity of filtrate and to also permit the use of the sand 24 as an additional filter medium.

A feed pipe 31 is connected into a feed aperture 32, the latter preferably lying in a horizontal plane with the vortex of the filter medium 15, as shown. While the inlet 31 may be positioned at a lower point, I find that in this position the best results are obtained. Preferably the inner discharge end of the pipe 31 is provided with a horizontally disposed elbow 33 to discharge the liquids to be filtered into the feed chamber 22 in a line substantially tangential to the tank 10 as illustrated in Figures 2 and 3. This effects a rotary motion of the incoming fluids, as indicated by the arrows, tending to throw the heavier solids towards the center or axis of the tank as particularly illustrated in Figure 2. By this rotary motion of the liquids the heavier solids will more readily work towards the bottom of the tank, permitting a more free and more rapid filtration of the finer solids from the liquids. This rotary motion also tends to cause the confined air bubbles to move upwardly around the vortex of the filter medium 15 and to more rapidly travel towards its perimeter and into the air chamber 21. It would also tend to cause the air bubbles to travel around the inclined top of the air chamber 21 and reach the highest point and discharge through the aperture 25.

A control valve 34 is provided in the feed pipe 31, the latter being connected with any source of liquid feed. In this instance, for purposes of illustration, I have shown the pipe 31 connected to a supply tank 35, this being elevated to give the necessary head pressure. It may be understood, however, that the pipe 31 may be connected with any suitable source of force feed, the velocity and flow of such feed, into the feed chamber 22, being suitably regulated by the valve 34.

For the purpose of reversing the flow through the filter medium 15, either for cleaning it and particularly removing accumulated matter from its lower inlet side, or for reverse filtration, I may provide a pipe 36 having a control valve 37. I have also here shown the pipe 36 connected with the supply tank 35, for purposes of illustration, it being understood that the pipe may be connected to any other suitable source of supply. Preferably the pipe 36 will be connected into the tank 10 in or above the plane of the discharge aperture 28.

As an additional means for not only cleansing the filter medium 15, from above, also for loosening up and cleansing the filter material 24, I may provide a pipe 38, as indicated in dotted lines in Figure 1 and in solid lines in Figure 4. This is in the form of a spiral arranged to lie a short distance above the upper face of the filter medium and is perforated, as shown at 39 in Figure 4, sufficient for the purpose.

In this form of device it may be readily understood that the liquids to be filtered are fed into the lower feed chamber 22, through the feed pipe 31, pass through the filter medium 15 into the upper or discharge chamber 40, and out through discharge pipe 29. As the liquids enter the chamber 22 and are given the rotary motion, as illustrated in Figures 2 and 3, the heavier solids will settle to the bottom, while the liquids will pass upwardly through the filter medium 15, and the material 24 when used, and in doing so the tendency of any contained air bubbles will be to travel towards the air chamber 21, around its inclined top 19, and may be drawn off either continuously or intermittently through the pipe 26. When the chamber 22 is first filled the valve 27 is opened, thus permitting the rising liquids in the chamber to force the confined air out through the pipe 26. The pipe 26 is of smaller diameter than the feed pipe 31, so that the valve 27 may be left open for some time after the valve 34 is opened, thus permitting a complete exhaustion of any confined air or air bubbles. By first leaving the valve 27 open the velocity of flow through the aperture 25 will tend to draw any accumulated air or bubbles out through the aperture 25.

In the form shown in Figure 5 the tank $10^a$ is provided with a conical bottom $12^a$, discharge pipe $13^a$ and valve $14^a$.

The filter medium $15^a$ is likewise of a conical configuration secured between bands $16^a$ and $16^b$. An annular V-shaped seat 41 is secured to the perimeter of the tank $10^a$ in which the filter band $16^a$ is seated. The upper filter band $16^b$ is secured to the lower flared end 42 of an air chamber 43. Chamber 43 is preferably disposed axial of the tank $10^a$ and is situated above the plane of the intake side of the filter medium $15^a$. It has a converging top 44 which terminates in a tube 45 into which an air discharge pipe 46 is connected; the latter being also provided with a control valve 47.

If desired, I may provide a slime or pulp agitator 48 secured to the lower end of a revoluble shaft 49, the latter being disposed axial of the tank $10^a$, air chamber 43 and tube 45, passing through a stuffing box 50 in the top of tube 45 and being supported intermediate its ends in a suitable bearing box 51.

In addition to the filter medium $15^a$, which may be like the filter medium 15, filter material $24^a$ is filled in above and supported by the medium $15^a$.

A feed pipe 31$^a$, having a control valve 34$^a$, is connected into the feed chamber 22$^a$, adjacent its bottom, and a discharge pipe 29$^a$, having a control valve 30$^a$, is connected into the tank above the plane of the filter medium 15$^a$ and the filter material 24$^a$.

In the above described form of apparatus the liquid to be filtered is fed through the pipe 31$^a$ into chamber 22$^a$, traveling upward and passing through the filter medium 15$^a$ and material 24$^a$, and out through the discharge pipe 29$^a$. As the liquid is agitated in the chamber 22$^a$ the heavier solids will settle to the bottom of the tank, where they may be periodically drawn off through the pipe 13$^a$. In traveling upward, and also in filling the tank, the confined air will be forced upwardly into the air chamber 43, where it may be removed either periodically, continuously or during the filling operation through the pipe 46. As the filtration proceeds the confined air bubbles will travel upwardly into the chamber 43 and be there confined, until drawn off, thus obviating the possibility of their working into the filter medium to any extent.

In Figure 6 I have illustrated the principles of my invention as applied to a vertical filter. This preferably comprises a tank 10$^b$ having a conical bottom 12$^b$ terminating in a clean-out pipe 13$^b$, provided with a valve 14$^b$. The feed in this instance is through a pipe 31$^b$ situated above the open end of the tank and having a control valve 34$^b$.

The filter medium in this case, designated by the numeral 15$^b$, is in the form of a vertically disposed cylinder supported axial with the tank 10$^b$ and spaced from its sides. It is secured at its lower end to a circular metallic band 52 which is seated in an annular U-shaped channel 53. This channel is supported upon and spaced from the inner face of the tank 10$^b$ by a peripheral flange 54 and a downturned flange 55. The band 52 may be cemented into the channel 53 by a suitable cement indicated at 56.

The upper end of the filter medium 15$^b$ is secured to a cylindrical section 18$^b$, which is inclined at its upper end, as in the case of the form illustrated in Figure 1, and provided with an outturned flange 19$^b$ and an upturned flange 20$^b$. The flange 19$^b$ seats upon the inturned flange 57 of an angle band 58 secured to the inner face of the tank 10$^b$; the space between the flange 20$^b$ and the angle band 58 being sealed by a suitable cement as indicated at 59. Thus the space formed by the sides of the section 18$^b$, flanges 19$^b$ and 57 form an air chamber 21$^b$ as described in connection with the form of apparatus illustrated in Figure 1, which lies above the plane of the intake side of the filter medium 15$^b$.

A discharge pipe 29$^b$, having a control valve 30$^b$, is connected into the tank above the plane of the intake side of the filter medium 15$^b$ at the highest point of inclination of the top of the air chamber 21$^b$, so that confined air will travel upwardly and be drawn off with the discharged filtrates. In this instance the space 22$^b$ constitutes the feed chamber and 40$^b$ the discharge chamber.

A suitable drain or clean-out pipe 60, having a control valve 61, may be connected into the tank at the bottom of the discharged chamber to clean out any sediment that may settle therein during the filtering operation.

As in the case of the form illustrated in Figure 1, the flow may be reversed in the forms illustrated in the Figures 5 and 6 to cleanse the inlet side of the filter media.

In connection with the form of vertical filter, illustrated in Figure 6, it may be noted that this may also be built up in multiple, either one above the other, in a single continuous tank, or concentric with each other, the only difference being that in the latter form the discharge chamber 40$^b$ of the inner filters will have two sides of filter media instead of one as illustrated.

While I have shown and described the preferred specific embodiment of my apparatus, together with some slightly modified forms, I nevertheless reserve the right to make such other changes or modifications in structure as will properly come within the scope of the claims appended hereto.

Having described my invention, I claim:

1. The method of separating solids from liquids by filtration comprising, regulating the feed and discharge of the liquid to be filtered and the filtrate so as to always maintain separate bodies of the liquids in contact with both sides of the filter medium; discharging the filtrate at a point above the plane of the intake side of the filter medium; trapping any accumulated air in the liquid, on the intake side of the filter medium, at a point above the plane of the intake side of the filter medium and removing said air during the filtering operation.

2. The method of separating solids from liquids by filtration comprising, first, cleansing the filter medium of all foreign matter having an affinity for the attraction of air bubbles; immersing the filter medium while wet in the liquid to be filtered, so as to form chambers on either side thereof; regulating the feed and discharge of the liquid and filtrate so as to always maintain the liquid in contact with both sides of the filter medium; discharging the filtrate at a point above the plane of the intake side of the filter medium; and removing any accumulated air from the liquid, on the intake side of the filter medium, at a point above the plane of the intake side of the filter medium.

3. The method of separating solids from liquids by filtration comprising, regulating the discharge of the filtrates so as to always maintain separate bodies of liquids in contact with both sides of the filter medium; regulating the velocity of flow of the liquids through the filter so as to maintain a layer of solids in loose and pervious formation adjacent the intake side of the filter medium so as to function as a part of the filter medium; discharging the filtrate at a point above the plane of the intake side of the filter medium; trapping any accumulated air in the liquid, on the intake side of the filter medium, at a point above the plane of the intake side of the filter medium and removing said air during the filtering operation.

4. An apparatus of the character described comprising a tank; a filter medium within the tank forming feed and discharge chambers; feed and discharge openings in said respective chambers, the discharge opening being situated above the plane of the intake side of the filter medium; an air chamber situated above the plane of the feed side of the filter medium and in communication with the feed chamber, the filter medium being formed to incline upwardly towards said air chambers to deflect air bubbles thereto; and air discharge means situated at the uppermost point of said air chamber.

5. An apparatus of the character described comprising a tank; a filter medium within the tank forming feed and discharge chambers; feed and discharge openings in said respective chambers, the discharge opening being situated above the plane of the intake side of the filter medium; an air chamber surounding the feed chamber and situated above the plane of the intake side of the filter medium and inclined at its top relative to the horizontal; and air discharge means situated at the uppermost point of said air chamber.

6. An apparatus of the character described, comprising a tank; a filter medium within the tank forming feed and discharge chambers on either side thereof; feed and discharge openings in said chambers; an air chamber extending along the wall of the tank and opening at its bottom into one of said chambers; said filter medium extending to and terminating at one side of the air chamber, the discharge opening being situated adjacent the top of said air chamber.

7. An apparatus of the character described, comprising a tank; a filter medium within the tank forming feed and discharge chambers on either side thereof; an imperforate air chamber, open at its bottom, extending along the tank wall, the filter medium being disposed beneath the air chamber and extending to and terminating at the bottom of the inner wall of the air chamber.

8. An apparatus of the character described, comprising a tank; a filter medium within the tank forming feed and discharge chambers on either side thereof; an imperforate air chamber, open at its bottom, extending along the tank wall, the filter medium being disposed beneath the air chamber and extending to and terminating at the bottom of the inner wall of the air chamber, feed means in the feed chamber and a discharge opening situated adjacent the top of the air chamber.

9. An apparatus of the character described, comprising a tank; a filter medium in the tank forming feed and discharge chambers on either side thereof; an imperforate air chamber, opening at its bottom into one of said chambers and extending along the tank wall, the filter medium being disposed beneath the open side of the air chamber and extending to and terminating at the bottom of the inner wall of the air chamber.

10. An apparatus of the character described, comprising a tank; a filter medium in the tank forming feed and discharge chambers on either side thereof; an imperforate air chamber, opening at its bottom into one of said chambers and extending along the tank wall, the filter medium being disposed beneath the open side of the air chamber and extending to and terminating at the bottom of the inner wall of the air chamber; feed means in the feed chamber and discharge means situated adjacent the top of the air chamber.

In witness that I claim the foregoing I have hereunto subscribed my name this 23rd day of October, 1926.

ANTHONY H. GODBE.